MAGNETIC CORE MEMORY

Filed May 25, 1960 7 Sheets-Sheet 1

INVENTORS.
ERICH BLOCH
HERBERT L. GELERNTER

BY

Thomas & Crickenberger

Dec. 14, 1965 E. BLOCH ETAL 3,223,984

MAGNETIC CORE MEMORY

Filed May 25, 1960 7 Sheets-Sheet 3

Dec. 14, 1965 E. BLOCH ETAL 3,223,984

MAGNETIC CORE MEMORY

Filed May 25, 1960 7 Sheets-Sheet 5

Dec. 14, 1965 E. BLOCH ETAL 3,223,984

MAGNETIC CORE MEMORY

Filed May 25, 1960 7 Sheets-Sheet 6

United States Patent Office 3,223,984

Patented Dec. 14, 1965

3,223,984

MAGNETIC CORE MEMORY

Erich Bloch, Poughkeepsie, and Herbert Gelernter, Briarcliff Manor, N.Y., assignors to International Business Machines Corporation, New York, N.Y., a corporation of New York Filed May 25, 1960, Ser. No. 31,706
18 Claims. (Cl. 340—174)

This invention relates to magnetic core storage devices, and more particularly to condition sensing means therefor.

In conventional storage devices the magnetic cores are arranged to form rows and columns in a single plane. Each row has a winding, herein referred to as a $y$-axis winding, and each column has a winding, herein referred to as an $x$-axis winding. By selectively energizing a particular $x$ and a particulary $y$-axis winding, a single core element in the plane is magnetically energized. Each core in the plane thus may be energized uniquely by specifying the appropriate $x$-axis and $y$-axis windings. The magnetic cores are of the so-called square hysteresis loop type, having two stable states—that of positive saturation (called 1) and that of negative saturation (called 0). The signals which energize the $x$ and $y$-axis windings are of such a magnitude that individually they can have no effect on the stable state of the cores. However, in that core in which the effect of the $x$ and $y$-axis signals is additive, the stable state of the core will be affected. The coincidence of positive signals will cause the core to become stable at positive saturation, while coincidence of negative signals will result in negative saturation. The application of the signals to a particular $x$ and a particular $y$-axis winding results in the storage of a bit of information in a specific core by driving it to positive saturaton if both signals are positive, or by leaving it at its original state of negative saturation if one of the signals is not positive.

To read out a bit of information stored in a particular core of the plane, the proper $x$-axis and $y$-axis windings are energized by signals which tend to drive only the selected core into negative saturation. A third winding, coupled to all the cores of the plane in series, senses whether or not the selected core changes its state. If the core changes state, an output pulse is induced in the sense winding; if not, no pulse results.

In the usual computer storage matrix a number of core planes such as those described above are stacked together, with corresponding $x$-axis and $y$-axis windings connected in series. By then applying signals to a single *x-axis* and a single $y$-axis winding, a single core in each plane is selected, and a bit of information is stored in each. This group of corresponding bits makes up a computer word, the length of which is equal to the number of planes. There can thus be as many words in a storage matrix as there are cores in a single plane, and each word may be uniquely selected by energizing the proper $x$ and $y$-axis windings. The $x$ and $y$-axis windings that must be energized to select a given word comprise the "address" of that word.

The readout of a word from a matrix system is similar to the readout of a bit from a single plane. The $x$ and $y$ axis windings which make up the address of the word to be read out are energized by signals tending to drive all the cores of the word to negative saturation. The sensing winding on each plane provides an output signal, or pulse, indicative of the state or condition of the selected bit in its plane. The outputs of all the sensing windings taken together comprise the readout of the whole word.

The readout process described above is known as destructive readout, since it leaves all the cores of a word at negative saturation, whereas originally those cores which produced an output pulse in the sensing winding were at positive saturation. In order to preserve the word information in the matrix, it is necessary to rewrite the word into the cores from which it was taken. In order to accomplish this the following operation takes place. The same $x$ and $y$-axis windings used in the readout operation are energized with signals, or pulses, of a polarity opposite to that used in the readout. These pulses tend to drive all the cores in the word toward positive saturation. However, each plane has, in addition to the $x$-axis, $y$-axis and sense windings, an inhibit winding which is wound on all the cores of the plane. The outputs of the sense windings are connected to flip-flop, or trigger, circuits having two stable states. The state of each flip-flop depends on whether or not it has received a pulse from its sense winding. Each inhibit winding is so connected to the output of its associated flip-flop that it is energized if the flip-flop is in the "0" state; that is, if no pulse was received from the sense winding—and is not energized if the flip-flop is in the "1" state; that is, if a pulse was received. Each inhibit winding is so arranged as to oppose either the $x$-axis or $y$-axis winding in each core of its plane so that the presence of a pulse in the inhibit winding will prevent the cores of that plane from being driven to positive saturation. Thus, if a 0 was originally present in a core, no pulse will appear in its sense winding, the associated flip-flop will remain in its 0 state, energizing the inhibit winding and preventing the writing of a 1 in that core during the rewrite cycle. Similarly, if a 1 was originally present in the core, a 1 will be rewritten.

Thus, the standard storage core matrix, as described above, consists of a stack of core planes each having four windings: $x$-axis, $y$-axis, sensing and inhibit windings. However, such an arrangement is capable only of reading and writing words. Often it is desirable to be able to determine which words in a matrix have a given characteristic, such as a 1 or a 0 in the cores of a certain plane of the matrix, so that only those words need to be read out. For example, if each word of the matrix contains a chemical compound, each plane of the matrix representing an element which might be contained in one or more of the compounds, it might be desired to seek out all the compounds which contain a specific element. Or, for example, it may be desired to have a computer prove theorems in, say, plane geometry. In this case, the storage matrix would contain many axioms, theorems and definitions which would have to be sorted for applicability toward the proof of the theorem to be proven. The storage systems in use today would require that every word in the matrix in turn be individualy read out, examined for the desired characteristic and then rewritten. In a large matrix system this can be a time consuming operation.

The foregoing disadvantages are minimized according to the present invention which provides circuits whereby each individual bit in a given plane may be read out directly, a row of cores at a time. This eliminates the necessity of reading all the words stored in the matrix to sample for a given tag in each, and thus allows the desired tag or characteristic to be sought out in fewer operations than is needed for word readout.

This is accomplished according to this invention by the addition of sense windings in the $x$ direction of each plane from which bit information is to be obtained and by the reversal of the usual functions of the $x$-axis and inhibit windings. The sense windings are arranged in parallel with the $x$-axis windings. Each $x$-direction sense winding is connected in series to a single column of core elements in each plane, and operates, during bit readout cycles, to provide output pulses in accordance with the state of the cores through which it passes. Means are provided to rewrite the bit information so obtained, as explained below.

Although this disclosure is directed to a specific embodiment involving the use of magnetic core storage elements, it is not intended to be limited thereto, for the system is equally adaptable to the use of other bistable storage devices, such as ferroelectric elements, superconductors and the like, as will be appreciated by those skilled in the art.

Thus it is an object of the invention to provide means for extracting from a storage matrix the information stored in a complete word, or the information stored in a particular portion of that word.

It is a further object of the invention to permit the reading out of those words of a matrix which have a given characteristic without necessitating the reading out of all the words stored in the matrix.

These and other objects of this invention may be more fully appreciated when considered in the light of the following specification and drawings in which.

Figure 3:
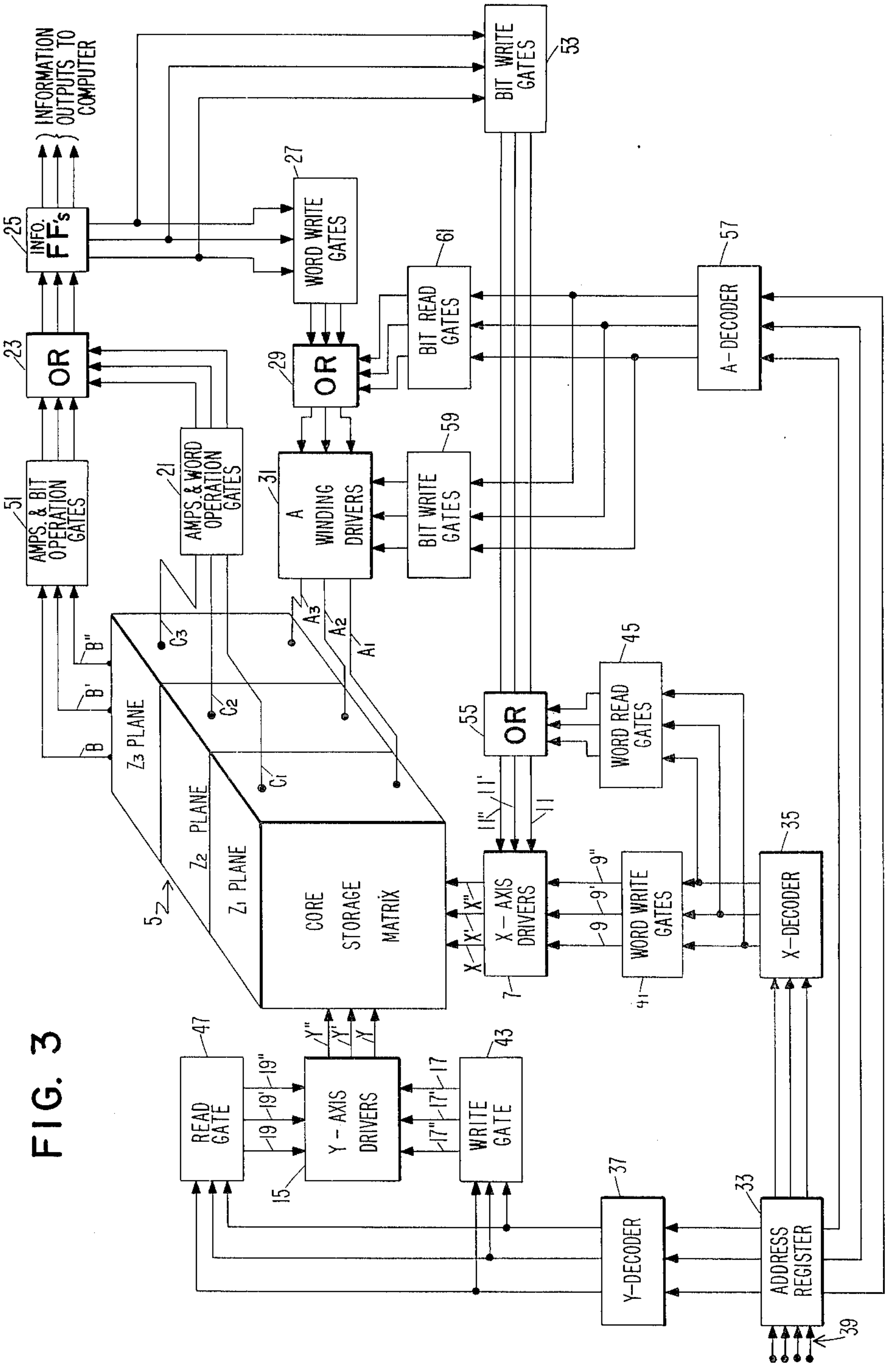
FIG. 3 is a simplified block diagram of the control circuitry for a core storage device embodying the invention.
Figures 4, 8:
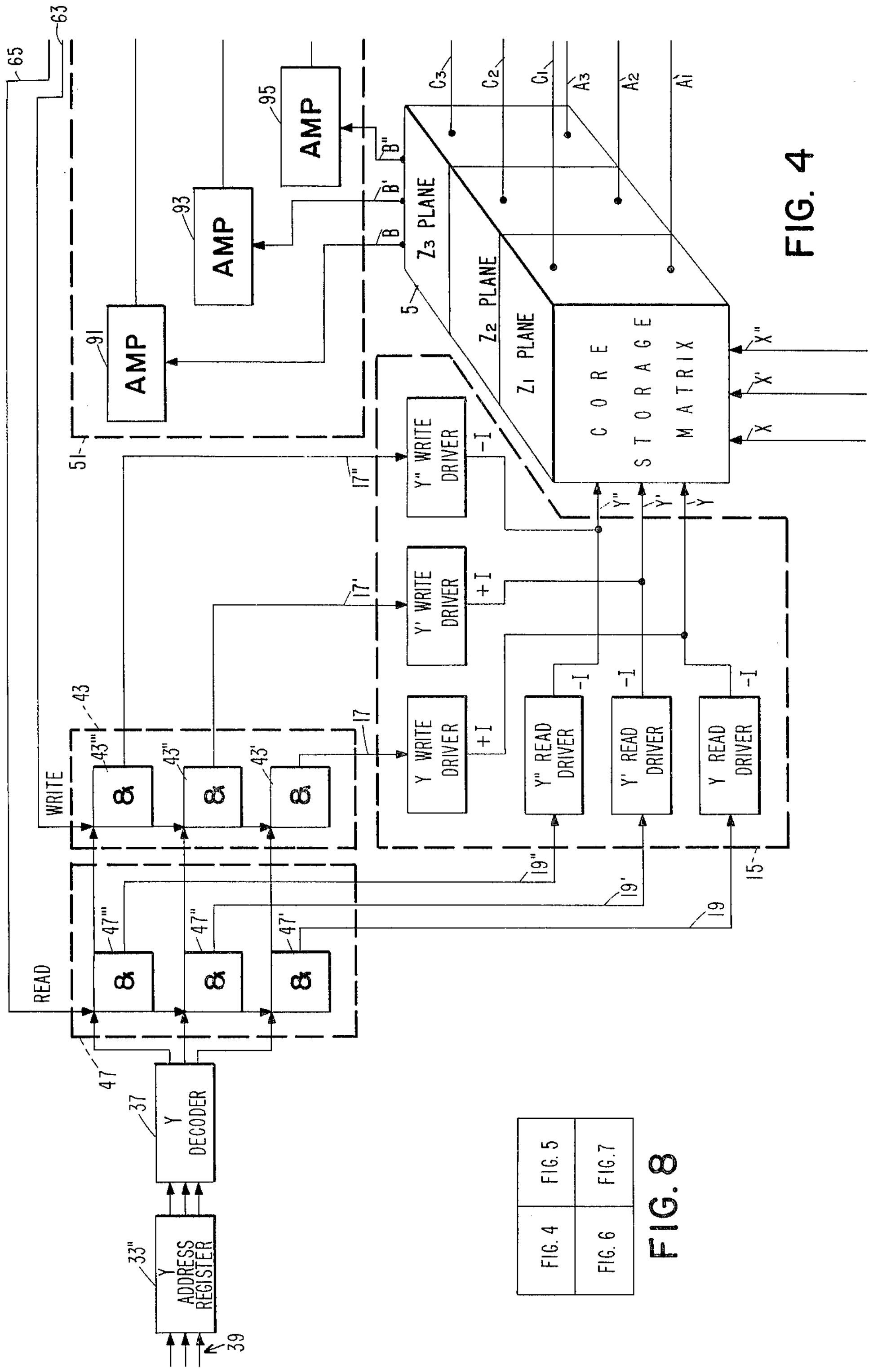

FIGS. 4, 5, 6 and 7 each show a portion of the schematic diagram of the circuitry of FIG. 3; and FIG. 8 shows the relationship of FIGS. 4–7.

Figure 1:
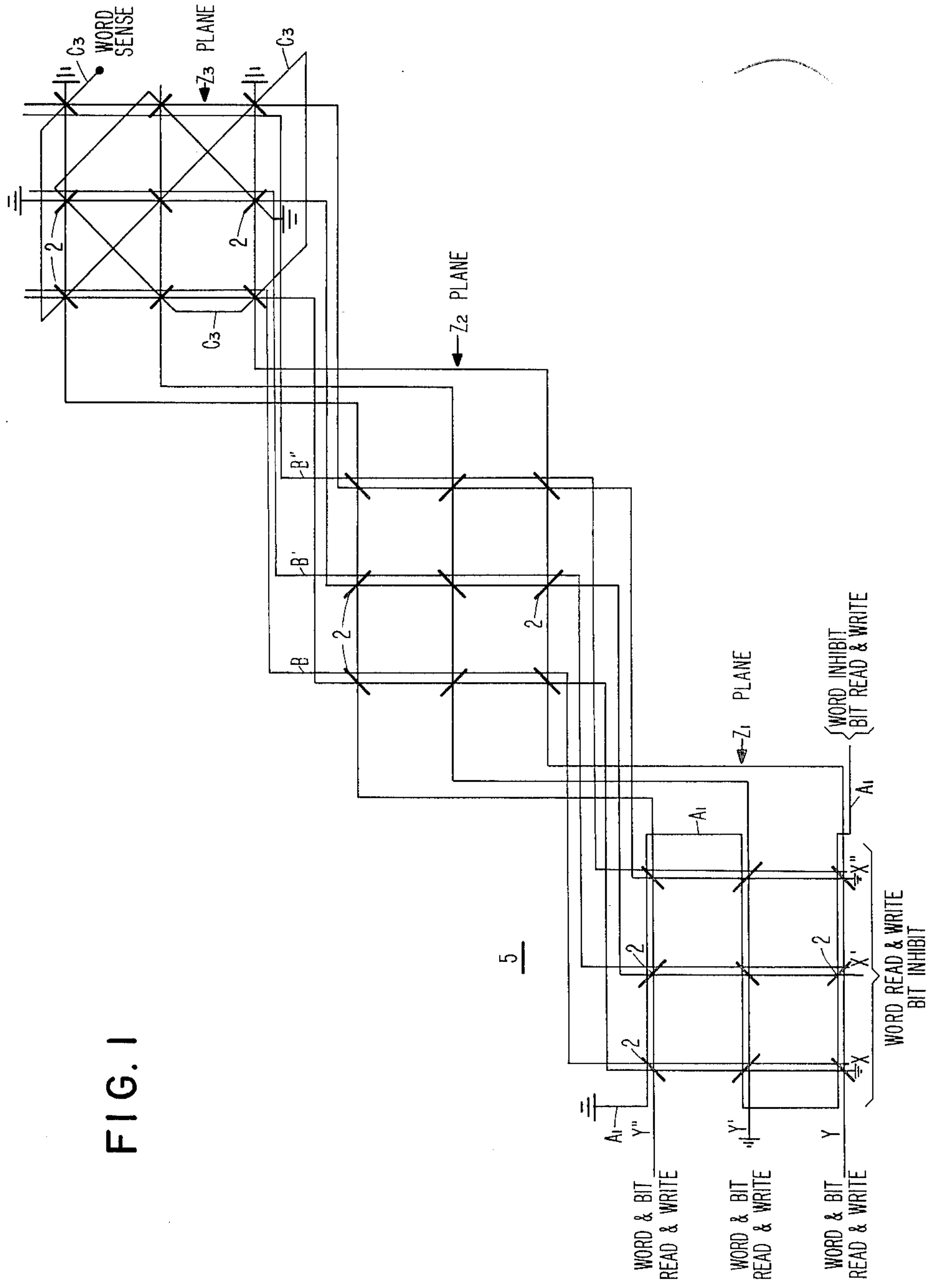
FIG. 1 is a schematic showing of a three-dimensional magnetic core storage device.

Referring now to FIG. 1 of the drawings, there is shown therein a three-dimensional core storage matrix 5 having magnetic core storage elements 2. The matrix of FIG. 1, as well as the matrices of the other figures of the drawings, is shown, for the sake of clarity and convenience, as having three rows and three columns of core elements in each plane, and as having three distinct planes. It will be apparent, however, that the invention is equally applicable to matrix systems of any desired dimensions. As shown in the figure, each of the conventional *x*-axis windings X, X′ and X″ is threaded through the core elements 2 of corresponding columns in each of the three planes $Z_1$, $Z_2$ and $Z_3$. Thus the winding X, for example, passes through all the core elements in the left-hand column of each plane. The conventional *y*-axis windings Y, Y′ and Y″ are each threaded through the core elements 2 of a single row of each plane. Thus, for example, winding Y passes through all the cores of the bottom row of each plane. The windings X, X′, X″, Y, Y′ and Y″, when properly energized, are used in conventional computer operations to write words into the storage matrix and to read out the words stored therein. In the novel type of operation contemplated by the present invention the *y*-axis windings function in the same manner as they do in conventional operations. However, the *x*-axis windings perform a different use, as will be set forth below.

In addition to the *x*-axis and *y*-axis windings described above, each plane of the matrix system carries a third winding, shown in the $Z_1$ plane of FIG. 1 as winding $A_1$. This winding passes through every core of its plane, as shown in the figure, and is utilized in conventional word-type computer operation as the inhibit winding. In the bit-type operation of the invention this winding exchanges its role with that of the *x*-axis windings and serves to read and write information in the matrix. A separate winding A is included in each plane of the matrix system. However, FIG. 1 shows such a winding only in the $Z_1$ plane in order that the manner in which each winding is wound may clearly be seen.

A fourth winding which is present in each plane is the sensing winding C shown in plane $Z_3$. This winding is utilized during the word readout operation to sense whether or not one of the cores in the plane on which it is wound changes its state of saturation. An output pulse is induced in winding C whenever a core changes state in the plane on which it is wound. The winding passes through the cores of the plane in the manner shown in FIG. 1 in order to preclude the appearance of stray signals at the output of the winding. Again, this winding appears only in the $Z_3$ plane for purposes of clarity and it should be understood that a similar winding is included in each plane of the matrix system.

The windings described thus far are those which comprise the conventional computer matrix. However, three additional windings, B, B′ and B″ are provided in the present device, which windings, taken together with the external circuitry to be described, permit the matrix system to be operated in such a manner that bit information may be written and/or read out of a given plane. Each B winding is so wound as to pass through all the core elements of a single column in each plane. There is a separate winding for each column. These windings are used to sense whether or not any of the cores through which they pass change their state of saturation during the bit readout cycle of operation. It is not necessary to include a set of these bit sense windings in each plane of the matrix system. The windings need only to be placed in those planes from which it will be desired to obtain bit information. However, it may be desirable to have the windings pass through all planes of the matrix, as shown, so as not to limit the bit readout function to just a few of the planes.

Figure 2:
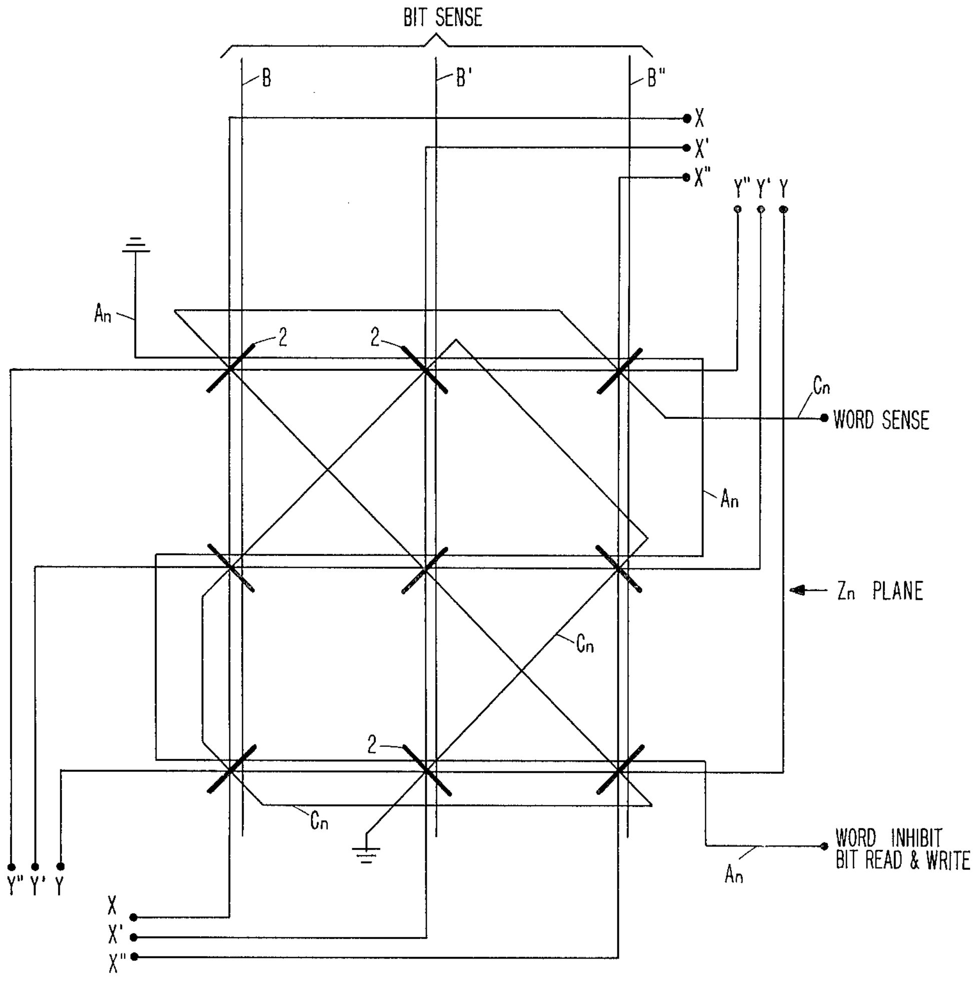
FIG. 2 shows the various windings which are included on the cores of a single plane of the matrix.

With reference now to FIG. 2 of the drawings, a plane $Z_n$ of the matrix system is shown as having all the windings described with reference to FIG. 1. Thus FIG. 2 shows the relationship of the various windings of the plane. This plane may be any plane of the matrix system which includes the bit sense windings. Those windings which are grounded at one end are windings which are associated with cores of only one plane; the remaining windings pass from one plane to the next in a series arrangement. The particular way in which the windings pass through the individual cores is not shown. However, each winding is threaded through each core in such a way that the application of a positive going current pulse to the input terminal of the winding will tend to drive each core through which the winding passes toward positive saturation, that is, the pulse will tend to write a One in each core. The pulses applied to the windings are of such a magnitude that a coincidence of two positive going signals are necessary to drive a given core to its stable state of positive saturation. Similarly, the coincidence of two negative going signals is necessary to drive a core from positive saturation to negative saturation. Thus, for example, application of a positive signal of magnitude I to each of windings X and Y″ will result in a signal of magnitude 2I at the upper left-hand core element. The coincidence of these two signals will cause this core element to assume a state of positive saturation. Since the windings X and Y″ are connected in series to each plane, application of the signals causes the upper left-hand core of each plane to become saturated in a positive direction.

However, if a pulse of magnitude $-I$ is applied to the inhibit winding $A_n$ of plane $Z_n$, in time coincidence with the aforementioned positive signals, the resultant signal at the upper left-hand core element of plane $Z_n$ will be $2I-I$, or I. Since a signal of magnitude I is not sufficient to change the state of the core, the upper left-hand core element of the plane $Z_n$ will remain in its original state of negative saturation, while the corresponding cores in the other planes of the matrix will become saturated in the positive direction. Thus it may be seen that application of a negative signal to the winding $A_n$ prevents, or inhibits, the writing of a One into a selected core element. By applying positive signals to various combinations of the $x$-axis and $y$-axis windings and by selectively applying negative pulses to the inhibit windings A of the various planes, each core element in the matrix system can be made to assume a predetermined state. This array of core storage elements may represent any desired information, which information is thus made available when it is needed.

In the same way that the application of positive signals of magnitude I to an $x$-axis and a $y$-axis winding cause word information to be written into the core elements of the matrix, the application of negative signals of magnitude I to the same $x$-axis and $y$-axis windings will cause that information to be read out of the core elements. The coincidence of two negative signals at a particular core element will drive that core in the direction of negative saturation. If that core is at positive saturation, application of these pulses will cause it to switch to negative saturation, inducing an output signal in the word sensing winding C associated with the plane of that particular core. If the core is at negative saturation, application of negative signals will not induce an output signal. Thus the application of negative readout signals to and $x$-axis and a $y$-axis winding produces outputs in the word sense windings C which are indicative of the states of the core elements through which those $x$-axis and $y$-axis windings pass. Such output signals are obtained during a word readout cycle of operation.

The bit read and bit write operations are performed in a manner similar to that of the word read and word write operations, the difference being in the windings used. For example, to read out bit information from a selected row of core elements in the plane $Z_n$, negative pulses are applied to the appropriate $y$-axis winding and to the bit read winding $A_n$. Assuming the selected row of core elements to the top row of plane $Z_n$, $y$-axis winding Y'' would be energized. The coincidence of the negative pulses from windings Y'' and $A_n$ in the top row of core elements tends to drive all these elements towards negative saturation. Those elements which are at positive saturation will change their state, inducing output signals in their associated bit sense windings B, while those elements which already are at negative saturation will not induce output signals. The outputs of windings B, B' and B'' thus provide indications of the state of each core of the top row of plane $Z_n$.

To rewrite the bit information read out of plane $Z_n$, positive signals are applied to windings Y'' and $A_n$, with the $x$-axis windings X, X' and X'' providing inhibit signals to those core elements which are to remain in a state of negative saturation.

Referring now to FIG. 3 of the drawings, in which a block diagram of the external circuitry associated with the core storage matrix system is shown, the numeral 5 indicates the core storage matrix of FIG. 1. As may be seen, the matrix is again represented as having three planes: $Z_1$, $Z_2$ and $Z_3$. Inputs to the $x$-axis and $y$-axis windings are shown at X, X', X'', Y, Y' and Y''. The $x$-axis and $y$-axis inputs are energized by drivers 7 and 15, respectively. The $x$-axis drivers 7 are selectively excited by pulses on inputs 9, 9' and 9'' to provide positive output signals, and by pulses at inputs 11, 11' and 11'' to provide negative output pulses. The $y$-axis drivers 15 are excited by signals on inputs 17, 17' and 17'' to provide positive outputs and by signals on inputs 19, 19' and 19'' to provide negative outputs. Excitation of drivers 7 and 15 to provide positive outputs results in the application of positive signals to the $x$-axis and $y$-axis windings of the storage matrix. Similarly, proper excitation of drivers 7 and 15 results in the application of negative signals to the windings of the storage matrix.

The output signals obtained during a word readout cycle of operation appear on word sense windings $C_1$, $C_2$ and $C_3$, which windings are wound on planes $Z_1$, $Z_2$ and $Z_3$, respectively, and are applied to the amplifiers and word operation gates 21. When actuated by a sample pulse, gates 21 are able to pass these output signals from windings $C_1$, $C_2$ and $C_3$, through the OR gates 23 to the information flip-flop circuits 25. The bistable trigger circuits 25 register Ones or Zeros in accordance with the signals thus received from windings $C_1$, $C_2$ and $C_3$. The signals appearing on windings $C_1$, $C_2$ and $C_3$ are induced by the switching of core elements in the several planes from a state of positive saturation to one of negative saturation. This switching is caused by the application of negative signals to selected $x$-axis and $y$-axis windings during a word readout cycle of operation.

Each of the flip-flops 25 has two definite outputs, one of which indicates the presence of a One in the flip-flop and can be used as a data line for further indication in the computer system, the other of which indicates the presence of a Zero and leads to write gates 27 and 53. Word write gates 27 may be actuated so as to pass the Zero indicating signals from flip-flops 25 to the OR gates 29. These signals pass through gates 29 to energize the A winding drivers 31 to produce negative signals, which signals may then be applied to windings $A_1$, $A_2$ and $A_3$.

To allow selection of the $x$-axis and $y$-axis windings which are to be excited, an address register 33 is provided which has X and Y decoders 35 and 37, respectively. The address register 33 has inputs 39, by means of which the operator of the device may place instructions in the register. Decoders 35 and 37 utilize the instructions in the register 33 to allow the energization of the desired $x$-axis and $y$-axis windings. Thus if it is desired to write a word into the core storage matrix the X and Y decoders 35 and 37 activate the write gates 41 and 43, which in turn provide signals for the $x$-axis and $y$-axis drivers 7 and 15. If, on the other hand, it is desired to read out a word that is contained in the core storage matrix 5, the $x$ and $y$ decoders 35 and 37 will activate the proper word read gates 45 and 47, thus providing readout signals to the $x$-axis and $y$-axis drivers.

The elements of FIG. 3 which thus far have been described are those elements of the system of the invention which enable this system to perform word operations in the conventional manner. The few remaining elements are the only ones that need be added to a conventional system to provide the bit operation which is the novel feature of this invention.

As has been mentioned, windings B, B' and B'' are the only windings that need be added to the conventional core storage matrix to enable it to be used in the bit operation of the invention. The external circuitry needed for such operation will now be described. The numeral 51 indicates the bit operation gates which are energized when it is desired to sense the condition of the various bits of a plane. It should be pointed out here that the windings B can be common to all planes, as shown, or they could be associated, in special cases, with a single, specific plane. When the bit operation gates 51 are activated, readout signals induced in the windings B pass through the gate 51, through the OR circuit 23 to the flip-flops 25. The flip-flops then assume a state of One or Zero in accordance with the signals received. If a particular flip-flop assumes a One it provides an output to the computer; if it assumes a Zero state it provides an output to a write gate. When the device is on bit operation the bit write gates 53 are activated rather than the word write gates 27, and signals from the flip-flop 25 are then passed through the gates 53, through OR gate 55 to energize the $x$-axis drivers 7, causing the drivers to provide negative output signals.

When bit sense windings B are present in more than one plane, it is necessary to provide an A winding decoder 57 energized by the address register 33. Decoder 57, operating through bit gates 59 or 61, then serves to activate the A winding driver 31 which in turn energizes the A winding in the proper plane. If only one plane is provided with the bit sense windings B then the A winding decoder 57 may be eliminated. Only one bit write gate 59 and one bit read gate 61 would be necessary to provide the proper A winding with either positive or negative read or write signals.

In bit operation the address register 33, through decoders 37 and 57, activates one of the read gates 47 and one of the read gates 61 to cause the $y$-axis drivers and the A winding drivers respectively to provide negative readout signals. In the plane in which the energized $y$-axis and A windings intersect, the cores through which both windings pass will be driven toward negative saturation. The bit sense windings B, B′ and B″ each will sense changes of state in those cores through which they pass and will provide corresponding output signals. These output signals will pass through gates 51 and 23 to the flip-flops 25. Those windings associated with cores which change their state will cause their corresponding flip-flops to assume the One state. Those windings which are associated with cores that do not change states, that is, that are already in a state of negative saturation, will allow their associated flip-flops to remain in a state of Zero, thus providing an output to the gates 27 and 53. This completes the bit readout cycle. Since the readout is destructive, if it is desired to retain the information in the core storage matrix it will be necessary to rewrite this information. This is done in the write cycle which normally immediately follows a read cycle. The address register 33 activates the write gates 43 and 59 through decoders 37 and 57, respectively. Write gates 43 and 59 feed signals to the chosen $y$-axis and A winding drivers which in turn provide positive signals to energize the selected $y$-axis and A windings. The selected windings are the same windings which were excited during the immediately preceding read cycle, but are now energized by signals of opposite polarity. The positive signals on these windings tend to drive the cores in which they intersect toward positive saturation. During this rewrite cycle the bit write gate 53 is also activated, passing signals from the flip-flops 25 through gate 55 to $x$-axis winding drivers 7. Those $x$-axis drivers which are connected to the flip-flops 25 that are in a Zero state are energized to provide negative signals to their corresponding $x$-axis windings. Since the $x$-axis windings also pass through the cores which are being driven toward positive saturation, those windings which carry a negative signal will prevent the cores through which they pass from reaching positive saturation, thus leaving them in their negative or Zero state. In this manner those cores which were originally in a negative or Zero state prior to the bit readout operation are maintained in their original state during the rewrite operation.

Reference is now made to FIGURES 4–7 of the drawings, which show in more detail the system of FIG. 3. The blocks of FIG. 3 are shown as dotted lines in these figures, and are indicated by the same numerals. FIG. 8 shows the relationship of FIGS. 4, 5, 6 and 7. Lines 63, 65, 67, 69 and 71 are the means by which instruction signals are applied to the various gating circuits to enable them to pass signals to and from the core storage matrix. The signals applied to these lines determine whether the system is to have word or bit type operation and whether the read or the write cycle is to be performed. Signals applied to line 63 activate those gates which must be utilized in the write cycle, while signals applied to line 65 initiate the read cycle. Signals applied to lines 69 and 71 determine whether the operation of the device is to be word type or bit type, respectively, and activate the gates which are utilized in those operations. As may be seen, the gate circuits indicated at 21, 27, 41, 43, 45, 47, 51, 53, 59 and 61 are AND gates, which must be energized by instruction signals from one or more of the lines 63, 65, 67, 69 and 71 before they will pass the information signals being read out or written into the core matrix 5. For example, the word read gate 45, shown in FIG. 6, contains one AND gate for each $x$-axis winding. When it is desired to perform the word read operation, signals from lines 65 and 69 are applied simultaneously to each gate. These signals enable the AND gates 45′, 45″ and 45‴ to pass signals from the X decoder 35 to the $x$-axis drivers through the OR gates 55. Absence of a signal on either line 65 or line 69 will not enable the AND gates to conduct. Similarly, if it is desired to utilize signals appearing on the bit sense windings B the bit operation gates 51, shown in FIGS. 4 and 5, must be actuated by signals on lines 67 and 71. Absence of either signal will not enable the AND gates of 51 to pass the signals from the bit sense windings.

The $x$-axis drivers 7, the $y$-axis drivers 15 and the A winding drivers 31 are shown as having an individual read and write driver for each winding that they excite. In each case the write driver provides a positive signal and the read driver provides a negative signal to its corresponding winding.

The operation of the system of FIGS. 4 through 7 will now be explained in some detail. In starting out it is assumed that all the cores in the storage matrix are in the state of negative saturation, that is, each core contains a Zero. Information is written into the storage matrix by first setting the flip-flops 25, shown in FIG. 5, into one of their stable states and then performing a write operation. To set the flip-flops into one of their stable states a source of new information 73 supplies signals through the OR gates 75′, 75″ and 75‴ to the individual flip-flops 25′, 25″, and 25‴, there being one such flip-flop for each plane of the core storage matrix. Each individual flip-flop receiving a signal from the source 73 is so triggered as to assume the stable state which represents a One, while those flip-flops which receive no signal from the source 73 remain in the stable state which represents Zero. The information thus placed in the flip-flop circuits 25 represents the word which is to be written into the core storage matrix. This information is transferred to the matrix by performing the word write operation. However, before the word write operation can be performed it must be determined where in the matrix the word is to be written, that is, it must be determined which $x$-axis winding and which $y$-axis winding is to be energized. This is accomplished by the address register 33, which has three sections: an X-address register 33′, shown in FIG. 6, a Y-address register 33″, FIG. 4, and an A-address register 33‴, in FIG. 7. The address register, acting in accordance with instructions provided it on inputs 39, specifies which windings are to be excited. The X address register 33′ specifies an $x$-axis winding by activating, through the decoder 35, a single one of the word write gates indicated at 41, as, for example, the AND gate 41′. Similarly, the Y address register 33″ specifies a $y$-axis winding to be energized by activating one of the write gates indicated at 43, for example, gate 43′. Since all the inputs of the AND gates 41 and 43 must be energized before an output signal is produced, the application of signals from the address registers 33′ and 33″ are not sufficient to provide energization for the $x$-axis and $y$-axis windings. However, the address register signals serve to prepare the AND gates 41′ and 43′ for the word write operation.

To transfer the information now contained in the flip-flop 25 to the storage matrix 5, instruction signals are applied to the write line 63 and the word line 69. The write signal 63 is applied to each of the AND gates at 41, to each of the AND gates at 59, to each of the AND gates at 53, to each of the AND gates at 27, and to each of the AND gates at 43. Of all these AND gates, the gate 43′ is the only one which produces an output signal since, in the example, this gate is also receiving a signal from the Y address register, and thus is receiving signals at all it sinputs. Thus a write signal is applied via line 17 to the $y$-axis write driver and thence to the winding Y. The word instruction signal applied to line 69 is applied to AND gates 41, AND gates 45, AND gates 47 and AND gates 21. This word signal cooperates with the write signal and the signal from the X address register to cause AND gate 41' to provide an output. This output is fed to the write driver of winding X, which provides a positive signal for the winding. Thus winding X and winding Y are both supplied with positive write signals, which signals tend to switch each core in which windings X and Y intersect to a state of positive saturation. In the absence of any inhibit signals, a One will be written into the lower left-hand core of each plane in the matrix 5. The word information signal on line 69 also cooperates with the write signal on line 63 to enable those AND gates 27 (FIG. 5) which receive input signals from flip-flops 25 to have an output signal. As previously mentioned, the individual flip-flop circuits 25', 25'' and 25''' provide outputs to the AND gates only when in the Zero state. Thus only certain of the AND gates 27 will provide output signals, this being in accordance with the state of the flip-flops as determined by the source of new information 73. If, for example, the flip-flop 25' is in the Zero state while the remaining flip-flops are in the One state, only the AND gate 27' will provide an output from the word write gate 27. This output passes through the OR gate 29' to excite the $A_1$ read driver and thus provide winding $A_1$ with a negative signal. Since neither AND gate 27'' nor AND gate 27''' provides an output, windings $A_2$ and $A_3$ remain unexcited. The presence of a negative signal on $A_1$, which passes through all the cores of plane $Z_1$, is sufficient to prevent, or inhibit, the switching of the lower left-hand core element from negative to positive saturation. Since no inhibit signal is applied to plane $Z_2$ or plane $Z_3$ the lower left-hand core elements of these planes will switch to positive saturation. In this manner the word information contained in the flip-flops 25 is transferred to the core storage matrix 5. The AND gates 59, 61, 53, 21, 51 and 45, each of which receives either a write or a word information signal from lines 63 and 69, are not conductive since these gates must each receive two instruction signals before they can provide an output.

Upon completion of this word write operation a reset signal is applied to lead 77 which then switches all the flip-flops 25 back to the Zero state, preparing them for another word write operation or for a readout operation.

As many words as desired may be stored in the core matrix 5 simply by successively energizing various combinations of $x$-axis and $y$-axis windings and applying the proper inhibit signals from the flip-flops 25. The information thus stored in the core storage matrix may be utilized in one of two ways; it may be read out one word at a time during a word read operation, or the information stored in individual core elements, or bits, in a given plane may be read out one row at a time during a bit read operation. The word read operation will be described first.

As in the case of the word write operation, the X address register 33' and the Y address register 33''', in accordance with instructions received from inputs 39, supply signals to the X and Y decoders, respectively. The X decoder 35 (FIG. 6) supplies an input signal to one of the AND gates indicated at 45, while the Y decoder 37 supplies an input signal to one of the AND gates 47. If, for example, it is desired to read out the word contained in the lower left-hand core elements of the several planes, then AND gates 45' and 47' would receive signals from the X and Y address registers, respectively. To initiate the word read cycle, instruction signals are applied to the read line 65, the sample line 67 and the word line 69. These signals are applied to the AND gates at 45. Since gate 45' is the only one receiving a signal from the X decoder 35, only that gate will provide an output. This output signal will pass through an OR gate at 55 and will energize the X read driver at 7 to provide a negative signal on the winding X.

The read signal on line 65 is also fed to the read gate 47 (FIG. 4), where it is applied to each of the AND gates 47', 47'' and 47'''. Since in the example the Y decoder 37 has only provided a signal for the gate 47' this gate alone will provide an output signal, which will be applied to the Y read driver. When this driver is so energized, it provides a negative input signal for winding Y. The application of negative signals to both windings X and Y causes all the core elements through which both windings pass to switch to a state of negative saturation. Thus the lower left-hand core element of each plane is driven toward negative saturation.

It will be recalled that in the example used to describe the word write operation the lower left-hand core of plane $Z_1$ was left in a state of negative saturation while the corresponding cores in planes $Z_2$ and $Z_3$ assumed positive saturation. It will be assumed that this word is the one to be read out in the word read cycle being described. Word sense windings $C_1$, $C_2$ and $C_3$ are used to detect the change of state of any core element in their associated planes. In the word read cycle of the example an output signal will not be induced in sense winding $C_1$, since no core in that plane will change state as a result of the application of negative signals to windings X and Y. Sense windings $C_2$, and $C_3$, however, will each provide an output pulse, since the negative signals applied to windings X and Y will cause the lower left-hand core element of plane $Z_2$ and plane $Z_3$ to change from positive to negative saturation, inducing signals in the windings. The output signals of the word sense windings are applied to the word operation gates at 21 shown in FIG. 5. The gates at 21 consist of AND gate 21', 21'' and 21'''. These AND gates are energized by signals from word instruction line 69 and sample instruction line 67, which energization enables signals from word sense windings $C_1$, $C_2$ and $C_3$ to produce output signals from the AND gates. The signals of windings $C_1$, $C_2$ and $C_3$ are amplified by amplifiers 85, 87 and 89, respectively, before they are fed to their respective AND gates. It should be noted at this point that if the sample instruction signal is not applied to line 65 the AND gates at 21 will not produce output signals and the information read out of the core storage matrix will be destroyed, leaving the cores that have been read out in a state of negative saturation.

Since, in the example, no signal appeared on word sense winding $C_1$ there will be no output from AND gate 21'. However, AND gates 21'' and 21''' provide output signals which pass through their corresponding OR gates at 23 (FIG. 5), through the amplifiers 81 and 83, respectively, through the OR gates 75'' and 75''', respectively, and are applied to flip-flops 25'' and 25'''. Flip-Flops 25'' and 25''' are thereby switched to their One states to provide outputs to the computer. The flip-flop 25', having received no signal from sense winding $C_1$, remains in its stable state of Zero. At this point, the information which was stored in the lower left-hand core elements of the matrix 5 has been transferred to the flip-flops at 25, the flip-flops containing Ones and Zeros in accordance with the states of the matrix cores. If it is desired that this information be restored to the core matrix, a word write cycle must be performed in the manner previously described, thus transferring the information contained in the flip-flops back to the matrix cores. The flip-flops 25 are then reset to Zero and the system is ready for the next operation. In this manner each word in turn may be read out of the core storage matrix. In the normal use of the word readout operation, the readout cycle will be immediately followed by the write cycle so that the information stored in the matrix will not be lost. If it is desired to clear the matrix of a word, a word read cycle is performed, omitting the sample pulse on line 67. This will prevent the word operation gates 21 from passing signals from the sense windings to the flip-flops, leaving the flip-flops in the Zero state, and leaving the cores in a state of negative saturation.

As has been mentioned before, it may at times be desirable to know which words in a core storage matrix have certain characteristics, such as, for example, which words contains a One in the $Z_2$ plane. In prior art devices, this information could only be obtained by reading each word of the matrix in sequence and sensing on winding $C_2$ which words had the required characteristic. This, of course, required as many word readout operations as there were words stored in the matrix, each word having to be read out and then rewritten. However, in the present system such information may easily be obtained by means of the bit sense windings B. To illustrate the use of the bit sense windings B, it will be assumed that it is desired to know which of the words stored in the core storage matrix 5 contain a One in the $Z_2$ plane. It will be recalled that in word type operation the $x$-axis and $y$-axis windings are used to drive the various core elements of the matrix to either positive or negative saturation, while the windings $A_1$, $A_2$ and $A_3$ perform an inhibiting function. In the bit type operation to be described, the $x$-axis windings and windings $A_1$, $A_2$ and $A_3$ exchange functions, the A windings acting in conjunction with the $y$-axis windings to drive the core elements to positive or negative saturation while the $x$-axis windings perform the inhibiting function. The bit readout operaton has two parts; the bit read cycle, and the bit write cycle, which normally are performed successively.

To initiate the bit read cycle, the Y address register 33″ and the A address register 33‴ provide information signals to the Y and A decoders 37 and 57, respectively, in accordance with the instruction signals received at inputs 39. The A decoder 57 (FIG. 7) provides a signal to the AND gates at 59 and 61 which are associated with the A winding of the plane which is to be read out, in this case the gates 59″ and 61″ which are associated with winding $A_2$ of plane $Z_2$. Similarly, the Y decoder 37 provides a signal to the AND gates at 43 and 47 which are associated with the $y$-axis winding which is to be energized. Note that in order to read out all the bits in the $Z_2$ plane it is necessary to perform only as many readout operations as there are $y$-axis windings. For each such readout operation winding $A_2$ is also energized. Assuming that for this first bit readout operation the $y$-axis winding Y is to be energized, the Y decoder 37 will apply a signal to the AND gates 43′ and 47′. Simultaneously with the appliaction of signals from the A and Y address registers, instruction signals are applied to read line 65, sample line 67 and bit line 71. The signals on the bit and read lines 65 and 71 are applied to the AND gates at 61, enabling these gates to pass signals from the decoder 57. Since the decoder is applying a signal only to AND gates 59″ and 61″, gate 61″ will be the only one to provide an output. This output will pass through an OR gate at 29 to the $A_2$ read driver which will energize winding $A_2$ with a negative signal. The signal on read line 65 will also be applied to the AND gates at 47 and will enable gate 47′ to pass a signal to the Y winding read driver. This driver will then provide a negative signal to winding Y. The application of negative signals to windings Y and $A_2$ will result in the core elements of the bottom row of plane $Z_2$ being driven toward negative saturation. The bit sense windings B, B′ and B″ each pass through one of the cores of the bottom row of plane $Z_2$. Those cores of the bottom row which contain a One, that is, are at positive saturation, will be switched to the Zero state, inducing output signals in their associated bit sense windings, while those cores which already contain Zeros, that is, are in a state of negative saturation, will not be switched by the coincidence of negative signals on the Y and $A_2$ windings and hence will not produce output signals on their associated bit sense windings. Since the output of each bit sense winding indicates the state of one of the cores in the bottom row, it is apparent that in a single bit read cycle the condition of a whole row of core elements may be determined.

Figure 5:
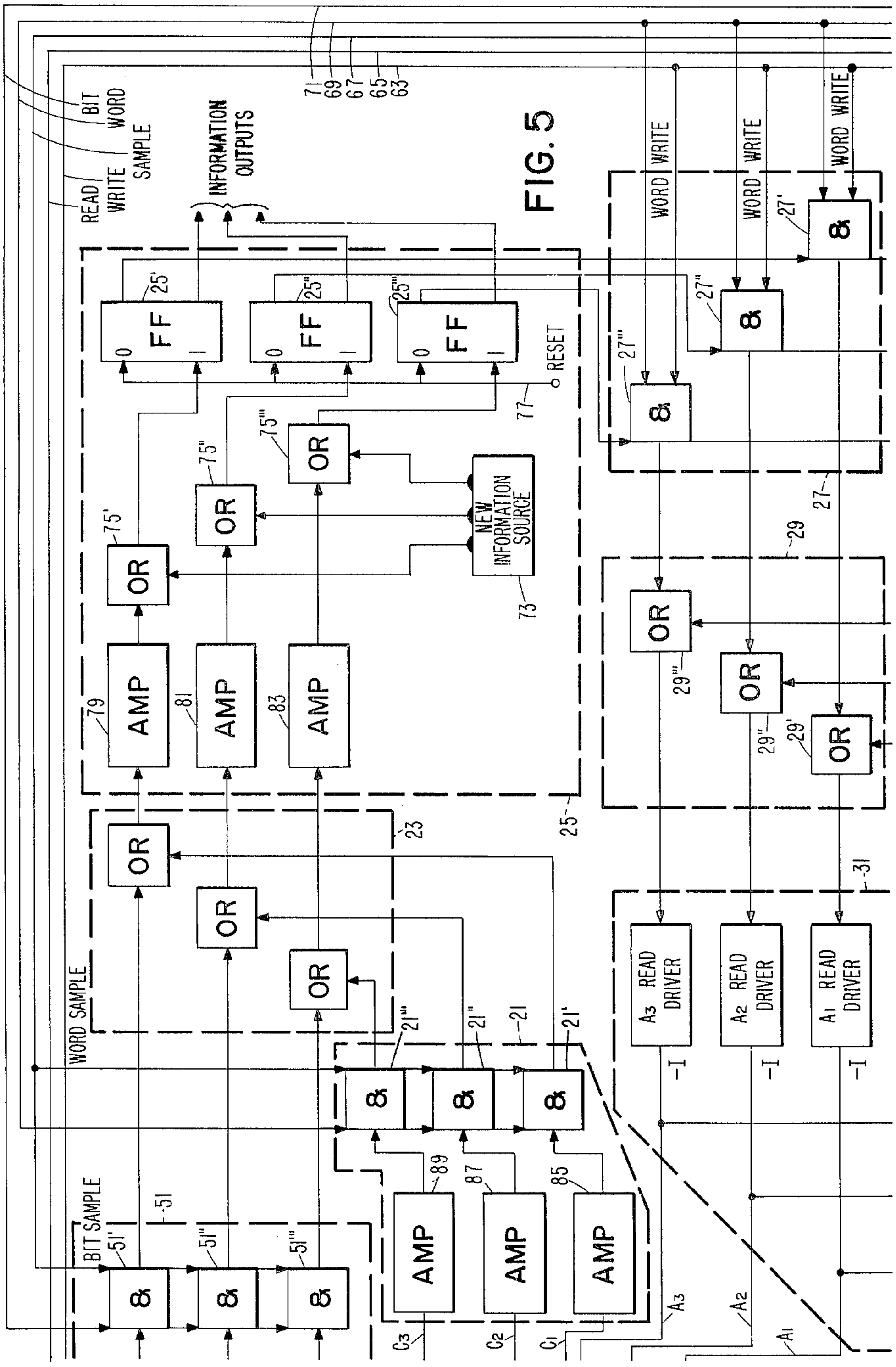
Figure 6:
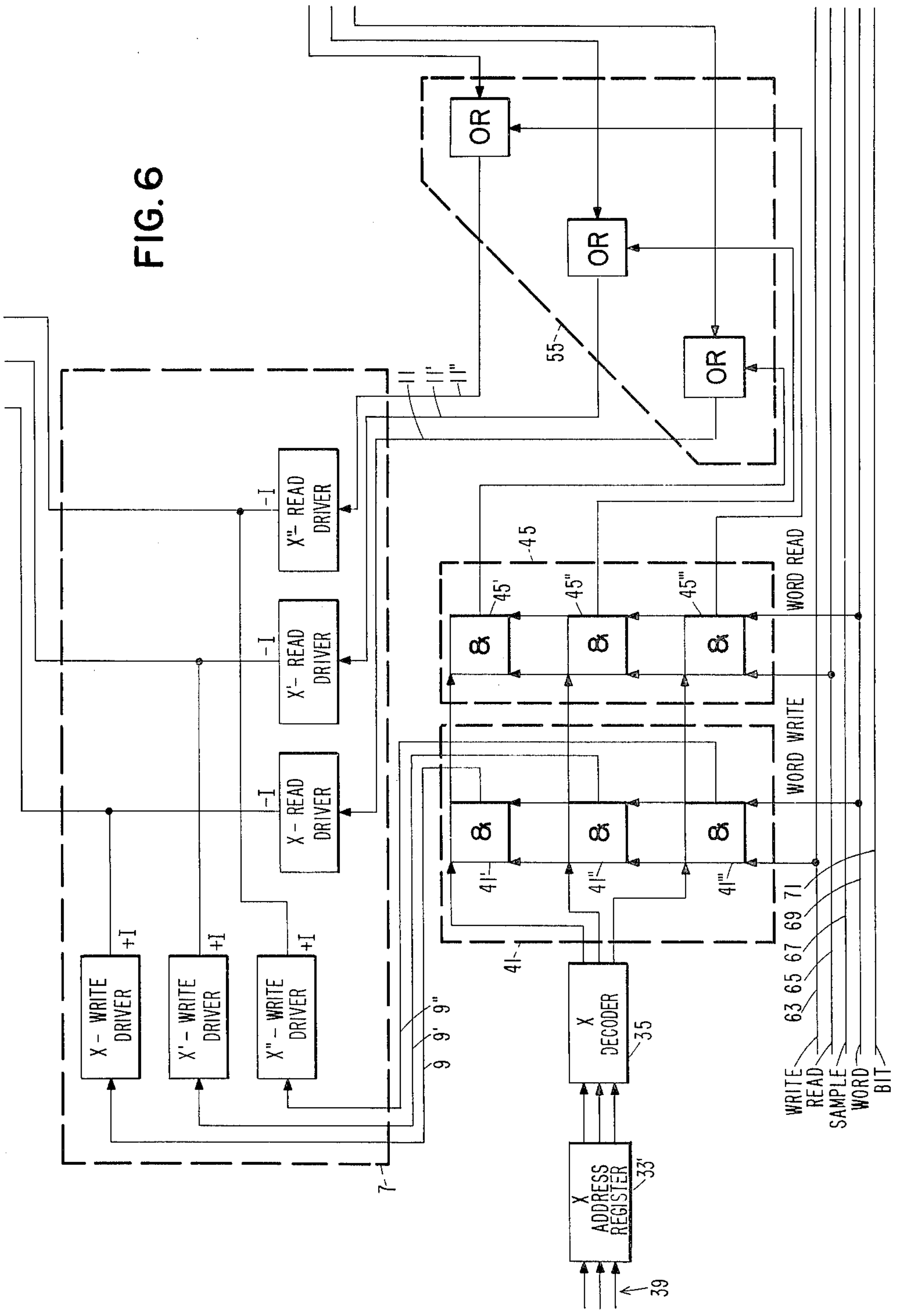

The output signals of sense windings B, B′ and B″ are fed through amplifiers 91, 93 and 95, respectively (FIG. 4), to AND gates 51′, 51″ and 51‴ (FIG. 5). The instruction signals applied to the lines 67 and 71 enable the gates at 51 to provide outputs upon receipt of signals from the bit sense windings. Those bit sense windings which sense the presence of a Zero in a core element do not provide inputs to their associated AND gates at 51, and these gates do not provide an output. It should be noted that the absence of a sample signal on line 67 during the readout cycle will result in destruction of the information obtained by the sense windings. The output signals from the AND gates at 51 pass through the OR gates at 23 and are applied to the flip-flops at 25 in the same manner as were the signals from the sense windings $C_1$, $C_2$ and $C_3$ during the word readout cycle. Thus, the flip-flops 25′, 25″ and 25‴ remain in their original Zero state or are switched to the One state in accordance with the signals induced in the bit sense windings. Those flip-flops which are switched to their One state provide output signals to the computer, as has been mentioned before.

At this point in the readout operation the information contained in the bottom row of core elements in the $Z_2$ plane has been transferred to the flip-flops 25. Since the readout cycle is destructive, that is, it leaves all the cores which have been sensed in a state of negative saturation, that information which is to be retained by the core storage matrix must be restored to it by means of a bit write cycle. To return this information to the matrix the $y$-axis winding and the A winding which were energized to readout the information are now supplied with signals of a polarity opposite to that used in the readout cycle. This is accomplished by applying instruction signals to bit and write lines 71 and 63. The signal on line 63 is applied to the write gates 43. At the same time the Y address register 33″ and Y decoder 37 apply a signal to AND gates 47′ and 43′. The coincidence of this signal and the write signal from line 63 causes AND gate 43′ to produce an output signal which actuates the Y write driver and provides a positive signal to winding Y. The application of bit and write signals to the AND gates 59 (FIG. 7), coinciding with the application of a signal from the A address register 33‴ through the A decoder 57 to the AND gate 59″ results in an output signal from AND gate 59″ which activates the $A_2$ write driver and provides a positive input signal to winding $A_2$. The positive signals in windings Y and $A_2$ drive all the cores of the bottom row of plane $Z_2$ toward positive saturation.

Figure 7:
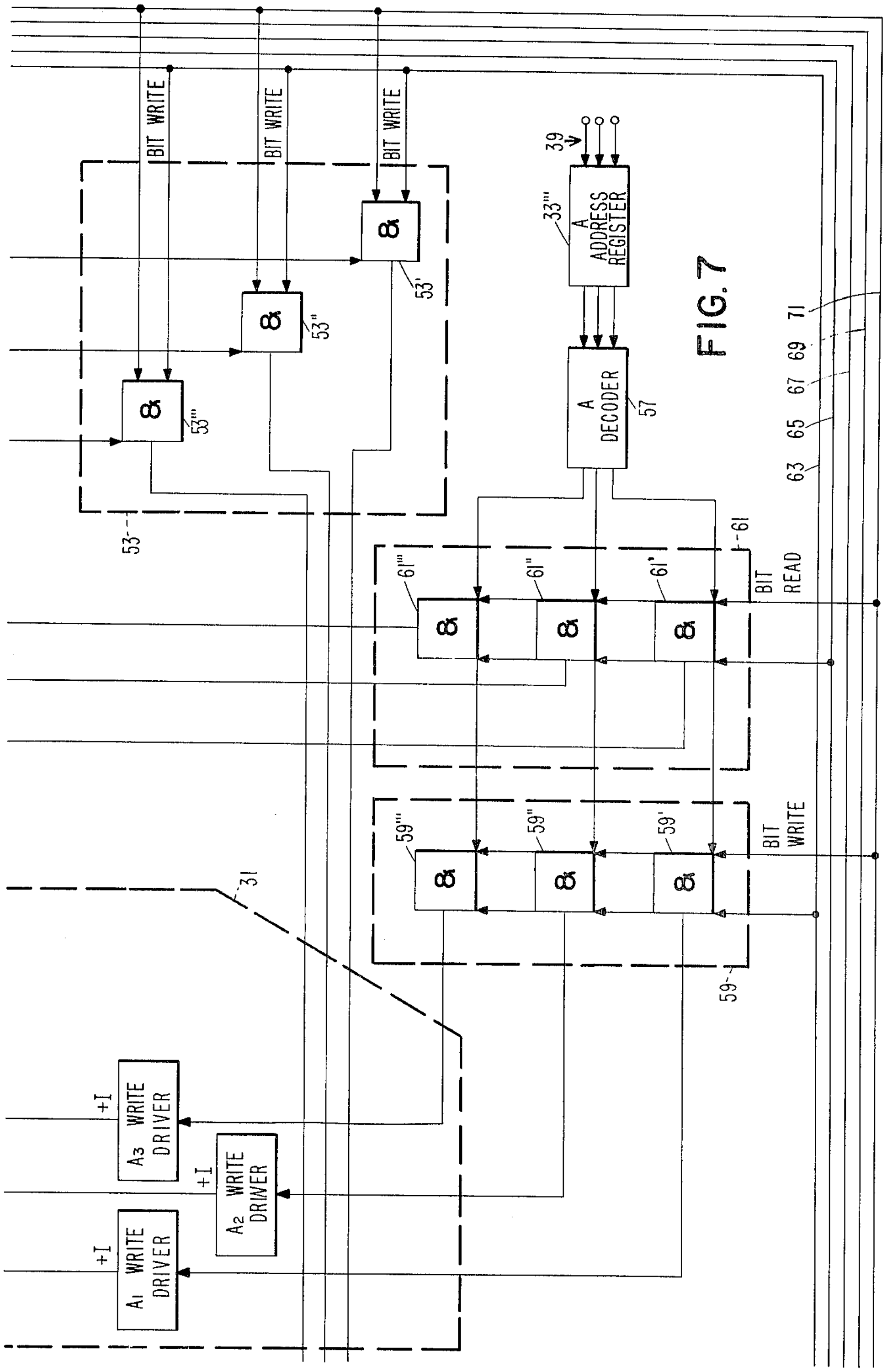

The bit and write instruction signals applied to lines 71 and 63 are also fed to the bit write gates at 53 (FIG. 7). Those flip-flops at 25 which contain a Zero provide output signals which are applied to their corresponding AND gates at 53. The gates at 53 which receive an output signal from a flip-flop provide output signals which pass through the OR gates at 55 and are applied to the corresponding $x$-axis read drivers at 7. The read drivers which receive signals from the gates at 53 provide negative inhibit signals to their corresponding $x$-axis windings. Those core elements in the bottom row of plane $Z_2$ through which pass the $x$-axis windings carrying negative signals will not be driven to positive saturation by the signals on windings Y and $A_2$, but will remain in their Zero state. In this manner those cores which induced no signal in their associated bit sense windings and thus left their corresponding flip-flops in a Zero state are maintained in a state of negative saturation during the bit write cycle, and thus the original information is restored to the cores.

Repetition of the bit readout and bit write cycles for each of the $y$-axis windings will allow each core element in plane $Z_2$ to be sensed by the windings B. Thus it may be seen that in the three row and three column matrix illustrated in the drawings all the cores of plane $Z_2$ may be sensed in three read-write operations, while nine such operations would be necessary to obtain the same information with a conventional system in which only word readout was available. It should also be noted that this arrangement permits the information stored in one plane to be modified without disturbing the information stored in the remaining planes. This may be accomplished by performing a bit read operation on the bits selected for modification, omitting the bit write operation. This will leave all of the magnetic cores for these bits in a state of negative saturation and thus in condition to receive new information from source 73 by way of flip-flops 25. This new information may be written into these magnetic cores by performing a bit write operation.

It is apparent from the above description of the operation of the system of the invention as well as from the accompanying drawings, that much of the circuitry used in the device performs more than one function. For example, the flip-flops 25 are used for both word and bit operation, the windings A are used as inhibit windings during word operation and as read or write windings during bit operation, and the $x$-axis windings are used as read or write windings during word operation and as inhibit windings during bit operation. By doubling up in this manner, substantial savings in the amount of equipment needed may be realized. If, however, the number of rows or columns of core elements differs from the number of planes, such doubling up of functions will not always be possible. For example, if the number of planes exceeds the number of columns of core elements in each plane then more flip-will be needed for the word readout function than will be needed for bit readout. Thus, only certain of the flip-flops will be used for both word and bit operation. Nevertheless, even in this situation a considerable savings in the total number of circuit elements used may be effected.

It is to be understood that the polarities of the signals applied to the various windings are merely relative, not absolute. Further, although the bit sense windings B have been shown as passing through columns of core elements they could equally well be placed on rows of core elements. In such a case the functions of the $x$-axis and $y$-axis windings during the bit read and bit write operations would be reversed.

Thus there has been shown and described a new and novel device for providing not only word information readout but bit information readout as well. While the fundamental features of the invention have been pointed out with reference to a specific embodiment, it will be understood that various omissions and substitutions in the device as illustrated may be made by those skilled in the art without departing from the spirit of the invention.

What is claimed is:

1. A magnetic core memory device having a three-dimensional core storage matrix composed of a plurality of planes, $x$-axis and $y$-axis windings inductively associated with the core elements of said matrix, means including said windings for magnetically saturating selected ones of said core elements in a first direction to write word information into said matrix, means including said windings for magnetically saturating selected ones of said core elements in a second direction to read word information out of said matrix, and means including serially connected bit sense windings inductively coupled to a plurality of said core elements in a given plane for reading only bit information simultaneously from selected ones of said plurality of core elements in the given plane of said storage matrix.

2. The memory device of claim 1, in which said bit sense windings are associated with core elements disposed along a selected axis of said matrix.

3. The device of claim 2, wherein said bit information is read out by driving selected ones of said core elements toward said second direction of magnetic saturation, and sensing which of said selected elements change from said first direction of saturation to said second direction.

4. A magnetic core memory device having a three-dimensional core storage matrix, said matrix having planes formed of rows and columns of core elements, $x$-axis windings associated with said columns of core elements, $y$-axis windings associated with said rows of core elements, inhibit windings and word sense windings associated with each of said planes, means for selectively energizing said $x$-axis, $y$-axis and inhibit windings to write word information into said matrix, means for selectively energizing said $x$-axis and $y$-axis windings to induce output signals in said word sense windings whereby word readout is obtained, bit sense windings associated with at least one of said planes, said bit sense windings being serially coupled to a plurality of core elements and being disposed parallel to the $x$-axis windings of said plane, and means for selectively energizing said $y$-axis and said inhibit windings to induce output signals in said bit sense windings, whereby bit readout is obtained.

5. In a magnetic core memory system, a three-dimensional storage matrix, means for writing word information into said matrix, means including word sense windings for reading out the word information contained in said matrix, said word sense windings providing output signals in accordance with the word information being read out, each of said word sense output signals being fed to a bistable trigger circuit to transfer the information from the matrix to the trigger circuit, means for restoring the transferred word information to the matrix, means including bit sense windings for reading out bits of information stored in said matrix, said bit sense windings providing output signals in accordance with the bit information being read out, each of said bit sense output signals being fed to said bistable trigger circuit to transfer bit information from said matrix to said trigger circuit, and means for restoring the transferred bit information to said matrix.

6. In a magnetic core storage device, a three-dimensional storage matrix having a plurality of planes, each plane being formed of bistable magnetic core elements arranged in rows and columns, each core element containing one bit of information, and corresponding core elements in the planes being grouped to form words, means for writing word information into said matrix, means for reading said word information out of said matrix, means including windings inductively associated with said core elements for reading bit information out of said matrix, and means including a part of said means for reading word information out for writing bit information into said matrix, whereby the bit information read out of said matrix may be restored thereto.

7. The device of claim 6, wherein said means for writing word information comprises an $x$-axis winding for each column of said core elements, the $x$-axis windings of corresponding columns in all of said planes being connected in series, a $y$-axis winding for each row of said core elements, the $y$-axis windings of corresponding columns in all of said planes being connected in series, each of said $x$-axis and $y$-axis windings having a write driver, an address register, an X decoder, and a Y decoder, said address register, X decoder and Y decoder being arranged to operate predetermined ones of said write drivers, whereby selected $x$-axis and $y$-axis windings may be energized.

8. The device of claim 7, wherein said means for writing word information further comprises an inhibit winding for each plane, each inhibit winding being inductively related to all the core elements in its plane, a read driver connected to each of said inhibit windings, one output of a bistable flip-flop circuit being connected to each of said read drivers, whereby each driver is either excited or not excited in accordance with the condition of its associated flip-flop circuit, and means to set each of said bistable flip-flop circuits in a predetermined condition, whereby selected ones of said read drivers are excited to energize selected ones of said inhibit windings.

9. In a magnetic core storage device, a three-dimensional storage matrix comprising a plurality of planes each made up of rows and columns of bistable magnetic core elements, individual core elements being adapted to store bit information and groups of core elements being adapted to store word information, means for writing word information into said matrix comprising *x*-axis, *y*-axis and inhibit windings inductively coupled to said groups of core elements, write drivers connected to each of said *x*-axis and *y*-axis windings, read drivers connected to each of said inhibit windings, an address register, an X decoder and a Y decoder coupled to said address register an being arranged to excite predetermined ones of said write drivers to energize the *x*-axis and *y*-axis windings of a selected group of core elements, each of said inhibit windings being connected through its associated read driver to an output terminal of a different one of a plurality of flip-flop circuits, whereby said inhibit winding read drivers may be excited to energize selected ones of said inhibit windings, means for reading word information out of said matrix comprising read drivers connected to said *x*-axis and *y*-axis windings and word sense windings inductively related to said groups of core elements, whereby the excitation of the *x*-axis and *y*-axis read drivers of a selected group of core elements produces output signals in said word sense windings in accordance with the stable conditions of the core elements of the group, means including bit sense windings coupled to said core elements for reading out of the storage matrix simultaneously the bit information stored in a plurality of said individual core elements upon excitation of selected ones of said *y*-axis and inhibit windings, and means for rewriting the readout bit information into said matrix.

10. The device of claim 9, wherein the output signal of each of said word sense windings is applied to the input of a different one of said flip-flop circuits, whereby the information read out of said matrix may be temporarily stored in said flip-flop circuits.

11. The storage device of claim 9 wherein said *x*-axis windings are disposed according to columns, said *y*-axis windings are disposed according to rows, said inhibit windings are disposed according to planes and said bit sense windings are disposed according to columns.

12. The storage device of claim 11 wherein said means for rewriting bit information includes a part of said means for writing word information.

13. The device of claim 10, wherein the output signal of the word sense winding of a given plane is applied to the input of that flip-flop circuit to which the inhibit winding of said given plane is connected.

14. The device of claim 13, wherein the means for reading out bit information comprises bit sense windings arranged to provide output signals upon excitation of selected ones of said *y*-axis and inhibit windings.

15. In a magnetic core storage device, a three-dimensional storage matrix having a plurality of planes, each plane including a plurality of bistable magnetic core elements arranged in rows and columns, each core element storing one bit of information and corresponding core elements in the planes being designated as storage for a word of information, an *x*-axis winding for each column of core elements, a *y*-axis winding for each row of core elements, corresponding *x*-axis and *y*-axis windings in each plane being connected in series, an inhibit winding for each plane coupled to all of the cores of the associated plane, a word sense winding for each plane coupled to all of the cores of the associated plane, a plurality of bit sense windings, one for each column of at least one plane of said matrix, said bit sense windings being coupled to all core elements of the associated column, said *x*-axis, *y*-axis and inhibit windings being energized to write and rewrite word information into said matrix and to read word information out of said matrix, a selected *y*-axis winding and a selected inhibit winding being energized to read information stored in magnetic core elements disposed in a selected row of a selected plane, and said selected *y*-axis winding, said selected inhibit winding and said *x*-axis winding being energized to write information in the magnetic core elements disposed in the selected row of the selected plane.

16. In a magnetic core storage device, a three-dimensional storage matrix having a plurality of planes, each plane being formed of bistable magnetic core elements arranged in rows and columns, each core element containing one bit of information and corresponding core elements in the planes being designated as storage for a word, means including an *x*-axis winding for each column of core elements, the *x*-axis windings of corresponding columns in all said planes being connected in series, a *y*-axis winding for each row of said core elements, the *y*-axis windings of corresponding columns in all of said planes being connected in series, and word inhibit and word sense windings for all the core elements of each plane whereby word information may be written into and read out of said storage matrix, at least one plane having a bit sense winding for each column of magnetic core elements therein, said bit sense windings serving to sense bit information read from a selected row of magnetic core elements in said at least one plane of said storage matrix, and means including a part of said word readout means for writing bit information in the selected row of magnetic core elements of said at least one plane of said storage matrix.

17. The magnetic core storage device of claim 16 wherein said means for reading bit information further including selectable ones of said *y*-axis and word inhibit windings.

18. The magnetic core storage device of claim 17 wherein said means for writing bit information further includes a selected one of said *y*-axis windings, a selected word inhibit winding and all of the *x*-axis windings, said *x*-axis windings being operable to inhibit storage of bit information.

References Cited by the Examiner

UNITED STATES PATENTS

| | | | |
|---|---|---|---|
| 2,736,880 | 2/1956 | Forrester | 340—166 |
| 2,739,300 | 3/1956 | Haynes | 340—174 |
| 2,784,391 | 3/1957 | Rajchman et al. | 340—166 |
| 2,802,203 | 8/1957 | Stuart-Williams | 340—166 |
| 2,993,196 | 7/1961 | Hughes | 340—172.5 |
| 3,031,650 | 4/1962 | Koerner | 340—174 |
| 3,068,452 | 12/1962 | Sarrafian | 340—174 |

FOREIGN PATENTS

| | | |
|---|---|---|
| 769,384 | 3/1957 | Great Britain. |

IRVING L. SRAGOW, *Primary Examiner.*

EVERETT R. REYNOLDS, *Examiner.*